(12) United States Patent
Sorin et al.

(10) Patent No.: US 8,571,410 B2
(45) Date of Patent: Oct. 29, 2013

(54) MUTUAL WAVELENGTH LOCKING IN WDM-PONS

(75) Inventors: Wayne V. Sorin, Mountain View, CA (US); Pavle Sedic, Santa Clara, CA (US)

(73) Assignee: Novera Optics, Inc., Santa Clara, CA (US)

( * ) Notice: Subject to any disclaimer, the term of this patent is extended or adjusted under 35 U.S.C. 154(b) by 1189 days.

(21) Appl. No.: 11/546,747

(22) Filed: Oct. 11, 2006

(65) Prior Publication Data

US 2008/0089692 A1  Apr. 17, 2008

(51) Int. Cl.
*H04J 14/00* (2006.01)
*H04B 10/00* (2013.01)

(52) U.S. Cl.
USPC .......... 398/68; 398/66; 398/79; 398/91; 398/135

(58) Field of Classification Search
USPC .......... 398/58, 66, 67, 68, 70, 71, 72, 79, 91, 398/93, 95, 140, 141, 153, 165, 168
See application file for complete search history.

(56) References Cited

U.S. PATENT DOCUMENTS

| | | |
|---|---|---|
| 4,341,438 A | 7/1982 | Seki et al. |
| 4,563,087 A | 1/1986 | Bourbin et al. |
| 4,912,526 A | 3/1990 | Iwaoka et al. |
| 4,947,134 A | 8/1990 | Olsson |
| 5,064,263 A | 11/1991 | Stein |
| 5,117,303 A | 5/1992 | Desurvire et al. |
| 5,202,780 A | 4/1993 | Fussanger |
| 5,221,983 A | 6/1993 | Wagner |
| 5,251,001 A | 10/1993 | Dave et al. |
| 5,251,054 A | 10/1993 | Lynn |
| 5,276,543 A | 1/1994 | Olshansky |
| 5,307,366 A | 4/1994 | Auffret et al. |
| 5,321,541 A | 6/1994 | Cohen |

(Continued)

FOREIGN PATENT DOCUMENTS

| | | |
|---|---|---|
| EP | 0 060 033 A | 9/1982 |
| EP | 0 607 029 A | 7/1994 |

(Continued)

OTHER PUBLICATIONS

E. E Wong, et al., "Low-cost WDM passive optical network with directly-modulated self-seeding reflective SOA", Electronics Letters, 2nd Mar. 2006, vol. 42, No. 5, 2pp.*

(Continued)

*Primary Examiner* — Danny Leung
*Assistant Examiner* — Daniel Dobson
(74) *Attorney, Agent, or Firm* — Blakely, Sokoloff, Taylor & Zafman LLP (57) ABSTRACT

Methods and apparatuses to provide wavelength locked WDM Passive Optical Networks ("PONs") are described. A first transceiver transmits a set of optical signals in a first direction along a wavelength channel. A second transceiver transmits another set of optical signals along the same wavelength channel in another direction. The wavelength of the first transceiver is locked using an optical power of the optical signals of the second transceiver. The wavelength of the second transceiver is locked using the optical power of the optical signals of the first transceiver. A WDM MUX/De-MUX is coupled between the first transceiver and the second transceiver. An in-line gain element can be coupled to the WDM MUX/De-MUX to amplify the optical signals. The first transceiver and the second transceiver operate in a saturated gain condition.

37 Claims, 4 Drawing Sheets

(56) References Cited

U.S. PATENT DOCUMENTS

| | | |
|---|---|---|
| 5,347,525 A | 9/1994 | Faris |
| 5,379,309 A | 1/1995 | Logan, Jr. |
| 5,408,349 A | 4/1995 | Tsushima et al. |
| 5,412,673 A | 5/1995 | Caprara et al. |
| 5,418,183 A | 5/1995 | Joyner et al. |
| 5,434,662 A | 7/1995 | Rockwell et al. |
| 5,436,760 A | 7/1995 | Nakabayashi |
| 5,440,417 A | 8/1995 | Chung et al. |
| 5,491,573 A | 2/1996 | Shipley |
| 5,550,666 A | 8/1996 | Zirngibl |
| 5,589,970 A | 12/1996 | Lyu et al. |
| 5,600,471 A | 2/1997 | Hirohashi et al. |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,717,795 A | 2/1998 | Sharma et al. |
| 5,773,345 A | 6/1998 | Ota |
| 5,793,512 A | 8/1998 | Ryu |
| 5,796,502 A | 8/1998 | Haller, Jr. |
| 5,812,572 A | 9/1998 | King et al. |
| 5,835,517 A | 11/1998 | Jayaraman et al. |
| 5,841,557 A * | 11/1998 | Otsuka et al. ................... 398/65 |
| 5,864,414 A | 1/1999 | Barnsley et al. |
| 5,880,865 A | 3/1999 | Lu et al. |
| 5,894,247 A | 4/1999 | Yoshida et al. |
| 5,907,417 A | 5/1999 | Darcie et al. |
| 5,920,414 A | 7/1999 | Miyachi et al. |
| 5,936,752 A | 8/1999 | Bishop et al. |
| RE36,471 E | 12/1999 | Cohen |
| 6,034,799 A | 3/2000 | Hansen |
| 6,081,355 A | 6/2000 | Sharma et al. |
| 6,097,523 A | 8/2000 | Boot |
| 6,120,190 A | 9/2000 | Mirman et al. |
| 6,134,037 A | 10/2000 | Shabeer et al. |
| 6,134,250 A | 10/2000 | Koren et al. |
| 6,137,611 A | 10/2000 | Boivin et al. |
| 6,178,001 B1 | 1/2001 | Kim |
| 6,192,170 B1 | 2/2001 | Komatsu |
| 6,195,200 B1 | 2/2001 | DeMarco et al. |
| 6,304,350 B1 | 10/2001 | Doerr et al. |
| 6,307,668 B1 | 10/2001 | Bastien et al. |
| 6,310,720 B1 | 10/2001 | Walker et al. |
| 6,323,994 B1 | 11/2001 | Li et al. |
| 6,437,907 B1 | 8/2002 | Yoon et al. |
| 6,469,649 B1 | 10/2002 | Helkey et al. |
| 6,470,036 B1 | 10/2002 | Bailey et al. |
| 6,498,869 B1 | 12/2002 | Yao |
| 6,498,871 B1 | 12/2002 | Kuboki |
| 6,597,482 B1 | 7/2003 | Chung et al. |
| 6,600,760 B1 | 7/2003 | Green et al. |
| 6,603,599 B1 | 8/2003 | Wang et al. |
| 6,650,840 B2 | 11/2003 | Feldman |
| 6,654,401 B2 | 11/2003 | Vieira et al. |
| 6,674,969 B1 | 1/2004 | Ogusu |
| 6,711,313 B2 | 3/2004 | Takiguchi et al. |
| 6,771,358 B1 | 8/2004 | Shigehara et al. |
| 6,868,200 B2 | 3/2005 | Kimotsuki et al. |
| 6,868,236 B2 | 3/2005 | Wiltsey et al. |
| 6,888,856 B2 | 5/2005 | Green et al. |
| 6,941,074 B2 | 9/2005 | Nakamura et al. |
| 7,006,719 B2 | 2/2006 | Joyner et al. |
| 7,075,712 B2 | 7/2006 | Kinoshita et al. |
| 7,092,595 B2 | 8/2006 | Sorin et al. |
| 7,106,974 B2 | 9/2006 | Lee et al. |
| 7,171,123 B2 | 1/2007 | Lee et al. |
| 7,254,344 B2 | 8/2007 | Kim et al. |
| 7,313,157 B2 | 12/2007 | Sorin et al. |
| 7,327,957 B2 | 2/2008 | Lee et al. |
| 7,349,631 B2 | 3/2008 | Lee et al. |
| 7,403,718 B2 | 7/2008 | Matthews et al. |
| 7,415,205 B2 | 8/2008 | Shin et al. |
| 7,593,444 B2 | 9/2009 | Sorin et al. |
| 7,613,398 B2 | 11/2009 | Lee et al. |
| 7,627,246 B2 | 12/2009 | Sorin et al. |
| 8,180,221 B2 * | 5/2012 | Lee et al. ................... 398/68 |
| 2001/0004290 A1 | 6/2001 | Lee et al. |
| 2001/0013962 A1 | 8/2001 | Li |
| 2001/0046364 A1 | 11/2001 | Ajima et al. |
| 2002/0039465 A1 | 4/2002 | Skinner |
| 2002/0067526 A1 | 6/2002 | Park et al. |
| 2002/0068859 A1 | 6/2002 | Knopp |
| 2002/0071173 A1 * | 6/2002 | Lee et al. ................... 359/337.1 |
| 2002/0097768 A1 | 7/2002 | Thornton |
| 2002/0126345 A1 | 9/2002 | Green et al. |
| 2002/0196491 A1 | 12/2002 | Deng et al. |
| 2003/0007207 A1 | 1/2003 | Healey et al. |
| 2003/0039010 A1 | 2/2003 | Akimoto et al. |
| 2003/0058500 A1 * | 3/2003 | Sugawara ................... 359/135 |
| 2003/0076560 A1 | 4/2003 | Pratt et al. |
| 2003/0095736 A1 | 5/2003 | Kish, Jr. et al. |
| 2003/0128917 A1 | 7/2003 | Turpin et al. |
| 2003/0142978 A1 | 7/2003 | Lee et al. |
| 2003/0165006 A1 | 9/2003 | Stephens et al. |
| 2003/0205706 A1 | 11/2003 | Lin et al. |
| 2003/0206740 A1 | 11/2003 | Lee et al. |
| 2003/0223672 A1 | 12/2003 | Joyner et al. |
| 2003/0223761 A1 | 12/2003 | Brown et al. |
| 2004/0033004 A1 | 2/2004 | Welch et al. |
| 2004/0033076 A1 * | 2/2004 | Song et al. ................... 398/70 |
| 2004/0067059 A1 | 4/2004 | Song et al. |
| 2004/0131358 A1 | 7/2004 | Jung et al. |
| 2004/0136716 A1 | 7/2004 | Jung et al. |
| 2004/0175188 A1 | 9/2004 | Bellemare et al. |
| 2004/0184805 A1 | 9/2004 | Shin et al. |
| 2004/0184806 A1 | 9/2004 | Lee et al. |
| 2004/0208208 A1 | 10/2004 | Shin et al. |
| 2004/0264400 A1 | 12/2004 | Lee et al. |
| 2005/0135449 A1 * | 6/2005 | Sorin et al. ................... 372/50 |
| 2005/0147412 A1 | 7/2005 | Park et al. |
| 2005/0152696 A1 | 7/2005 | Shin et al. |
| 2005/0163503 A1 | 7/2005 | Lee et al. |
| 2005/0259989 A1 | 11/2005 | Sorin et al. |
| 2005/0286895 A1 | 12/2005 | Lee et al. |
| 2006/0002706 A1 * | 1/2006 | Lee et al. ................... 398/71 |
| 2006/0045542 A1 | 3/2006 | Chu et al. |
| 2006/0093360 A1 * | 5/2006 | Kim et al. ................... 398/71 |
| 2006/0262324 A1 | 11/2006 | Hays et al. |
| 2006/0263090 A1 | 11/2006 | Lee et al. |
| 2007/0014509 A1 | 1/2007 | Kish, Jr. et al. |
| 2007/0081823 A1 | 4/2007 | Lee et al. |
| 2007/0274729 A1 | 11/2007 | Lee et al. |
| 2008/0089692 A1 | 4/2008 | Sorin et al. |
| 2008/0137698 A1 | 6/2008 | Sorin et al. |
| 2008/0232805 A1 | 9/2008 | Lee et al. |
| 2010/0221008 A1 | 9/2010 | Lee et al. |

FOREIGN PATENT DOCUMENTS

| | | |
|---|---|---|
| EP | 0 688 114 A | 12/1995 |
| EP | 0 844 706 A2 | 5/1998 |
| EP | 0 844 706 A3 | 2/1999 |
| EP | 0 991 217 A2 | 4/2000 |
| EP | 1 024 541 A | 8/2000 |
| EP | 1 089 098 A | 4/2001 |
| EP | 1124296 | 8/2001 |
| EP | 1 195 867 A1 | 4/2002 |
| EP | 1 388 963 A2 | 2/2004 |
| GB | 2 122 371 A | 1/1984 |
| JP | 61-114624 | 6/1986 |
| JP | 02-261236 | 10/1990 |
| JP | 06-252860 | 9/1994 |
| JP | 8 -163097 | 6/1996 |
| JP | 09-233052 | 9/1997 |
| JP | 10-23478 | 1/1998 |
| JP | 11-211924 | 8/1999 |
| JP | 2000-174397 | 6/2000 |
| JP | 2000-196536 | 7/2000 |
| JP | 2000-292636 | 10/2000 |
| JP | 2001-127377 | 5/2001 |
| JP | 2001-188140 | 7/2001 |
| JP | 2001-203643 | 7/2001 |
| JP | 2001-230733 | 8/2001 |
| JP | 2001-257658 | 9/2001 |

(56) References Cited

FOREIGN PATENT DOCUMENTS

| | | |
|---|---|---|
| JP | 2001-356377 | 12/2001 |
| JP | 2002-141927 | 5/2002 |
| JP | 2002-270949 | 9/2002 |
| JP | 2002-374207 | 12/2002 |
| JP | 2003-14963 | 1/2003 |
| JP | 2003-17798 | 1/2003 |
| JP | 2003-69502 | 3/2003 |
| JP | 2003-124893 | 4/2003 |
| JP | 2003-124911 | 4/2003 |
| JP | 2003-134058 | 5/2003 |
| JP | 2004-159328 | 3/2004 |
| KR | 00-33946 | 6/2000 |
| KR | 10-2000-0033946 A | 6/2000 |
| KR | 00-39036 | 7/2000 |
| KR | 10-2001-0063062 A | 7/2001 |
| KR | 01-93921 | 10/2001 |
| KR | 10-2002-0003318 | 1/2002 |
| KR | 2002-0005326 | 1/2002 |
| KR | 0325687 | 2/2002 |
| KR | 10-2003-0063085 A | 7/2003 |
| KR | 10-2003-0065632 A | 8/2003 |
| KR | 10-2003-0086223 A | 11/2003 |
| KR | 1020020083410 | 1/2004 |
| KR | 10-2004-0023305 A | 3/2004 |
| KR | 10-2004-0025304 A | 3/2004 |
| KR | 0454887 | 10/2004 |
| KR | 10-2004-0103085 A | 12/2004 |
| KR | 0496710 | 6/2005 |
| KR | 10-0515259 | 9/2005 |
| KR | 10-2006-0042486 A | 5/2006 |
| KR | 10-2007-0021122 | 2/2007 |
| KR | 10-0680815 | 2/2007 |
| WO | WO 97/49248 A1 | 12/1997 |
| WO | WO 98/32196 | 7/1998 |
| WO | WO 98/45974 A2 | 10/1998 |
| WO | WO 99/37002 A1 | 7/1999 |
| WO | WO 99/59010 A1 | 11/1999 |
| WO | WO 00/05788 | 2/2000 |
| WO | WO 00/10271 | 2/2000 |
| WO | WO 03/032547 A2 | 4/2003 |
| WO | WO 03/063401 A2 | 7/2003 |
| WO | WO 03/065621 A1 | 8/2003 |
| WO | WO 03/102659 | 12/2003 |
| WO | WO 03/107057 A1 | 12/2003 |
| WO | WO 2004/028047 A1 | 4/2004 |
| WO | WO 2004/034621 A2 | 4/2004 |
| WO | WO 2004/034621 A3 | 4/2004 |
| WO | WO 2004/047344 | 6/2004 |
| WO | WO 2004/059915 A1 | 7/2004 |
| WO | WO 2004/107628 A1 | 12/2004 |
| WO | WO 2005/069516 A1 | 7/2005 |
| WO | WO 2005/099148 A1 | 10/2005 |
| WO | WO 2006/005981 A1 | 1/2006 |
| WO | WO 2007/027042 A1 | 3/2007 |

OTHER PUBLICATIONS

Xiaomin Jin et al., "Bandwidth enhancement of Fabry-Perot quantum-well lasers by injection-locking", Jun. 12, 2006, Solid-State Electronics, p. 1141-1149.*

Russell M. Kurtz et al., "Mutual Injection Locking: A New Architecture for High-Power Solid-State Laser Arrays", May/Jun. 2005, IEEE Journal of Selected Topics in Quantum Electronics, vol. 11, No. 3, pp. 578-586.*

Dong Jae Shin, et al., "Hybrid WDM/TDM-PON With Wavelength-Selection-Free Transmitters", Journal of Lightwave Technology, vol. 23, No. 1, Jan. 2005, pp. 187-195.

E. Wong, et al., "Low-cost WDM passive optical network with directly-modulated self-seeding reflective SOA", Electronics Letters, Mar. 2, 2006, vol. 42, No. 5, 2pp.

Wai Hung, et al., "An Optical Network Unit for WDM Access Networks With Downstream DPSK and Upstream Remodulated OOK Data Using Injection-Locked FP Laser", IEEE Photonics Technology Letters, vol. 15, No, 10, Oct. 2003, pp. 1476-1478.

L.Y. Chan, et al., "Upstream traffic transmitter using injection-locked Fabry-Perot laser diode as modulator for WDM access networks," XP006017703, Electronic Letters, vol. 38, No. 1, pp. 43-45 (Jan. 3, 2002).

PCT Notification of Transmittal of the International Search Report and the Written Opinion of the International Searching Authority or the Declaration for PCT Counterpart Application No. PCT/US2007/012239 Containing International Search Report, 14 pgs. (Jan. 3, 2008).

Kim, H.D. et al., "A Low-Cost WDM Source with an ASE Injected Fabry-Perot Semiconductor Laser," XP000968561, IEEE Photonics Technology Letters, vol. 12, No. 8, pp. 1067-1069 (Aug. 2000).

Feldman, Robert D. et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).

Takahashi, H. et al., "Transmission characteristics of arrayed-waveguide NxN wavelenth multiplexer," IEEE Photonic Technology Letters, vol. 13, No. 3, pp. 447-455 (Mar. 1995).

International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).

J. Heanue et al., "Widely Tunable Laser Module using DFB Array and MEMS Selection with Internal Wavelength Locker", OFC 2003/ vol. 1, pp. 82-83.

B. Pezeshki et al., "12 Element Multi-wavelength DFB Arrays for Widely Tunable Laser Modules", OFC 2002, pp. 711-712.

Jae-Seung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).

PCT International Preliminary Report on Patentability dated Apr. 15, 2009 for International Application No. PCT/US2007/012239.

Derek Mayweather, et al., "Wavelength Tracking of a Remote WDM Router in a Passive Optical Network," XP000624886, IEEE Photonics Technology Letters, vol. 8, No. 9, pp. 1238-1240 (Sep. 1, 1996).

Database WPI, Section E1, Week 20011, Derwent Publications ltd., London, GB, AN 2001-098850, XP002276043.

D.K. Jung, et al., "Wavelength-Division-Multiplexed Passive Optical Network Based on Sprectrum-Slicing Techniques," IEEE Photonics Technology Letters, vol. 10, No. 9, pp. 1334-1336 (Sep. 1998).

J.S. Lee, et al., "Sprectrum-Sliced Fiber Amplifier Light Source for Multichannel WDM Applications," IEEE Photonics Technology Letters, vol. 5, No. 12, pp. 1458-1461 (Dec. 1993).

P. Healey, et al., "Spectral Slicing WDM-PON Using Wavelength-Seeded Reflective SOAs," Electronics Letters, vol. 37, No. 19, pp. 1181-1182 (Sep. 13, 2001).

Qiao Yaojun, et al., "A New Scheme for WDM-Based Passive Optical Access Network," 4 pgs. (2000).

S.V. Kartalopoulos, Introduction to DWDM Technology: Data in a Rainbow, pp. 56-57 (2000).

K. Petermann, "Laser Diode Modulation and Noise," Noise Characteristics of Solitary Laser Diodes, Section 7.3.2 Mode partition noise pp. 163-166 (1991).

Oh, Tae-Won et al., "Broadband Light Source for Wavelength-Division Multiple Access Passive Optical Network," Dept. of Electrical Engineering, Korea Advanced Institute of Science and Technology and Novera Optics Korea, Inc., Nov. 29, 2007, OECC 2003.

D.D. Sampson, et al., "100mW Sprectrally-Uniform Broadband ASE Source for Sprectrum-Sliced WDM Systems," XP006001052, Electronics Letters, vol. 30, No. 19, pp. 1611-1612 (Sep. 15, 1994).

McMahon, Donald H., et al."Echelon grating multiplexers for hierachically multiplexed fiber-optic communication networks, "Applied Optics, vol. 26, No. 11, pp. 2188-2196 (Jun. 1, 1987).

Jung, et al., "Spectrum-Sliced Bidirectional WDM PON," Optical Fiber Communication Conference, vol. 2, pp. WJ6-2 to WJ6-4 (2000).

Zah, C., et al., "Amplifiers with Angled Facets, Fabrication and Performance of 1.5MUM GAINASP Traveling-Wave Laser," Electronics Letters, IEE Stevenage, GB, vol. 23, No. 19, Sep. 10, 1987, pp. 990-992, XP000710298, ISSN: 0013-5194.

(56) References Cited

OTHER PUBLICATIONS

Chang-Hasnain et al., "Integrated external cavity quantum well laser array using single eptaxial growth on a patterned substrate," Applied Physics Letters, Vo. 56, No. 5, Jan. 1990.

Zirngibl, M., et al., "An 18-Channel Mulitfrequency Laser," IEEE Photonics Technology Letters, vol. 9, No. 7, Jul. 1996, pp. 870-872 (3 pages).

Zirngibl, M., et al., "Study of Spectal Slicing for Local Access Applications," IEEE Photonics Technology Letters, vol. 8, No. 5, pp. 721-723 (May 1996).

Woodward, S.L.,et al., "A Spectrally Sliced PON Employing Fabry-Perot Lasers," IEEE Photonics Technology Letters, vol. 10, No. 9, pp. 1337-1339 (Sep. 1998).

Iwashita, Katsushi, et al., "Suppression of Mode Partition Noise by Laser Diode Light Injections," IEEE Journal of Quantum Electronics, vol. QE-18, No. 10, pp. 1669-1674 (Oct. 1982).

Feuer, M.D., et al., "Singe-Port Laser-Amplifier Modulators for Local Access," IEEE Photonics Technology Letters, vol. 8, No. 9, pp. 1175-1177 (Sep. 1996).

Haruna, Masamitsu, et al., "Optical Waveguide Power Distributor and Multichannel Modulator and Demodulator," Piezo-Electricity and Acousto-optic, No. 4 of 1983, pp. 58-67, Apr. 1983.

Jinshan, Xie, "Application of Wavelength Division Muliitplexing (WDM) Technology in Passive Optical Network," Development of Laser and Optocelectronics (Supplement), No. 9 of 1999, pp. 67-70, Sep. 1999.

Youlong, Yu, et al., "Study on a Novel High Power Broadband Light Source," Chinese Journal of Lasers, vol. A28, No. 1, pp. 71-73, Jan. 2001.

Yunfeng, Shen, et al., "The Research on Layering Structure and Network Management of Photonic Transport Networks," Journal of China Institute of Communications, vol. 19, No. 7, pp. 18-24, Jul. 1998.

Presby, H.M., et al., "Amplified integrated star couplers with zero loss," Photonics Technology Letters, IEEE vol. 3, Issue 8, Aug. 1991, pp. 724-726.

Shin, et al., "155 Mbit/s TrasmissionUsing ASE-Injected Fabry-Perot Laser Diode in WDM-PON over 700C Temperature Rage," Electronics Letters, Sep. 4, 2003, vol. 39, No. 18, pp. 1331-1332.

Choi, K.M., "Broadband Light Source by Mutually Injected FP-LD's" OECC/COIN 2004, Jan. 1, 2004, pp. 882-884, XP009126452.

Jin, Xiaomin, et al., "Bandwidth enhancement of Fabry-Perot quantum-well lasers by injection-locking" Jun. 12, 2006, Solid-State Electronics, p. 1141-1149.

Takachio, N., et al., "Wide Area Gigabit Access Network based on 12.5GHz Spaced 256 Channel Super-Dense WDM Technologies", Electronic Letters, vol. 35, No. 5, XP6016306, 2 pgs., (Mar. 1, 2001).

Baik, J., et al., "Wavelength Self-Managed Optical WDM Source Using Polarization-Multiplexed Fabry-Perot Laser Diodes", IEEE Photonics Technology Letters, vol. 16, No. 10, Oct. 2004.

Kikuchi, Kazuro "Effect of 1/f—Type FM Noise on Semiconductor-Laser Linewidth Residual in High-Power Limit", IEEE Journal of Quantum Electronics, vol. 25, No. 4, Apr. 1989, pp. 684-688.

\* cited by examiner

MUTUAL WAVELENGTH LOCKING IN WDM-PONS

FIELD OF THE INVENTION

Embodiments of the invention relate to Wavelength Division Multiplexing Passive Optical Networks ("WDM PONs"), and more specifically, to wavelength locked WDM PONs.

BACKGROUND

Generally, Passive Optical Networks ("PONs") included passive optical components, e.g., fibers, splitters and couplers, are provided to guide traffic between a Central Office ("CO") and remote Optical Network Units ("ONUs") located at customer premises. The passive optical components are devices that operate to pass or restrict light. The passive optical components do not have electrical power or processing requirements.

A conventional WDM PON performs bi-directional communication by using two different wavelength bands. Downstream optical signals may be transmitted from a Central Office to a remote Optical Network Unit located at a customer's premise through one wavelength band, e.g., in a wavelength range from 1570 nanometers ("nm") to 1620 nm. Upstream optical signals may be transmitted from the Optical Network Unit to the Central Office through another wavelength band, e.g., in a wavelength range from 1450 nm to 1500 nm. Optical signals are transmitted through a number of discrete wavelength channels that exist in these wavelength bands. For example, the wavelength band to transmit downstream signals may contain sixteen discrete optical channels to carry information from the Central Office to sixteen discrete subscribers. Similarly, another wavelength band to transmit upstream signals may contain another sixteen discrete optical channels to carry information from the sixteen discrete customers to the Central Office.

Using different wavelength channels to transmit data in upstream and downstream directions is typically expensive.

A conventional Time Domain Multiplexing ("TDM") PON communication between the Central Office and remote ONUs may be performed over a single feeder fiber. In the TDM PON architecture, the same bandwidth is shared between multiple ONUs, and dedicated transmission time slots are granted to each individual ONU, to avoid data collision. In the conventional TDM PONs, one user typically cannot have more bandwidth without decreasing the bandwidth of other users.

SUMMARY

Embodiments of wavelength locked wavelength division multiplexing ("WDM") Passive Optical Networks ("PONs") are described. A WDM PON includes a first transceiver to transmit a set of optical signals in one direction along a wavelength channel. A second transceiver is coupled to the first transceiver to transmit another set of optical signals along the same wavelength channel in another direction. The wavelength of the first transceiver is locked using an optical power of the optical signals of the second transceiver. The wavelength of the second transceiver is locked using the optical power of the optical signals of the first transceiver. A wavelength division multiplexing ("WDM") multiplexer/de-multiplexer ("MUX/De-MUX") is coupled between the first transceiver and the second transceiver. An in-line gain element can be coupled to the WDM MUX/De-Mux to amplify the optical signals. The first transceiver and the second transceiver operate in a saturated gain condition to reduce incoming intensity fluctuations.

Other features and advantages of embodiments of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, in which.

DETAILED DESCRIPTION

Embodiments of wavelength locked wavelength division multiplexing ("WDM") Passive Optical Networks ("PONs") are described. The WDM PON includes a first transceiver to transmit a set of optical signals to a second transceiver along a wavelength channel. The second transceiver at a remote location transmits another set of optical signals along the same wavelength channel to the first transceiver. The first transceiver and the second transceiver can transmit the optical signals along the same wavelength channel in the same time. An Optical Line Termination ("OLT") located at a Central Office ("CO") can have the first transceiver. Optical Network Unit ("ONU") located at a remote place can have the second transceiver. The first transceiver and the second transceiver transmitting the optical signals over the same wavelength channel are wavelength locked to each other through a mutual injection process. The wavelength of the first transceiver is locked using the optical power of the optical signals of the second transceiver. The wavelength of the second transceiver is locked using the optical power of the optical signals of the first transceiver. A wavelength division multiplexing ("WDM") multiplexer/de-multiplexer ("MUX/De-MUX") that has one or more wavelength channels is coupled between the first transceiver and the second transceiver. The first transceiver and the second transceiver can be coupled to the same wavelength channel of the WDM MUX/e-MUX. An in-line gain element can be coupled to the WDM MUX/De-MUX to amplify the optical signals within the transmission band. The first transceiver and the second transceiver operate in a saturated gain condition.

Embodiments of WDM PONs described herein may use the same wavelength band for both the upstream and downstream communication between CO and remote sites. Using the same wavelength band for both the upstream and downstream communication may increase the efficiency of data communication, may reduce the bandwidth requirements, and may reduce the cost of the WDM PON. For one embodiment, all transceivers at CO and ONUs may be identical, and optical components of the WDM PON (e.g., MUxes/De-MUXes) may be specified over a single wavelength band. Additionally, the mutual injection process of transceivers at CO and at the remote site may eliminate the need for one or more broadband light sources that can provide the injection signal to wavelength lock the transceivers. Removal from the WDM PON of one or more broadband light sources to provide the injection signals to the transceivers may reduce the cost and may simplify the maintaining of the WDM PON.

Figure 1:
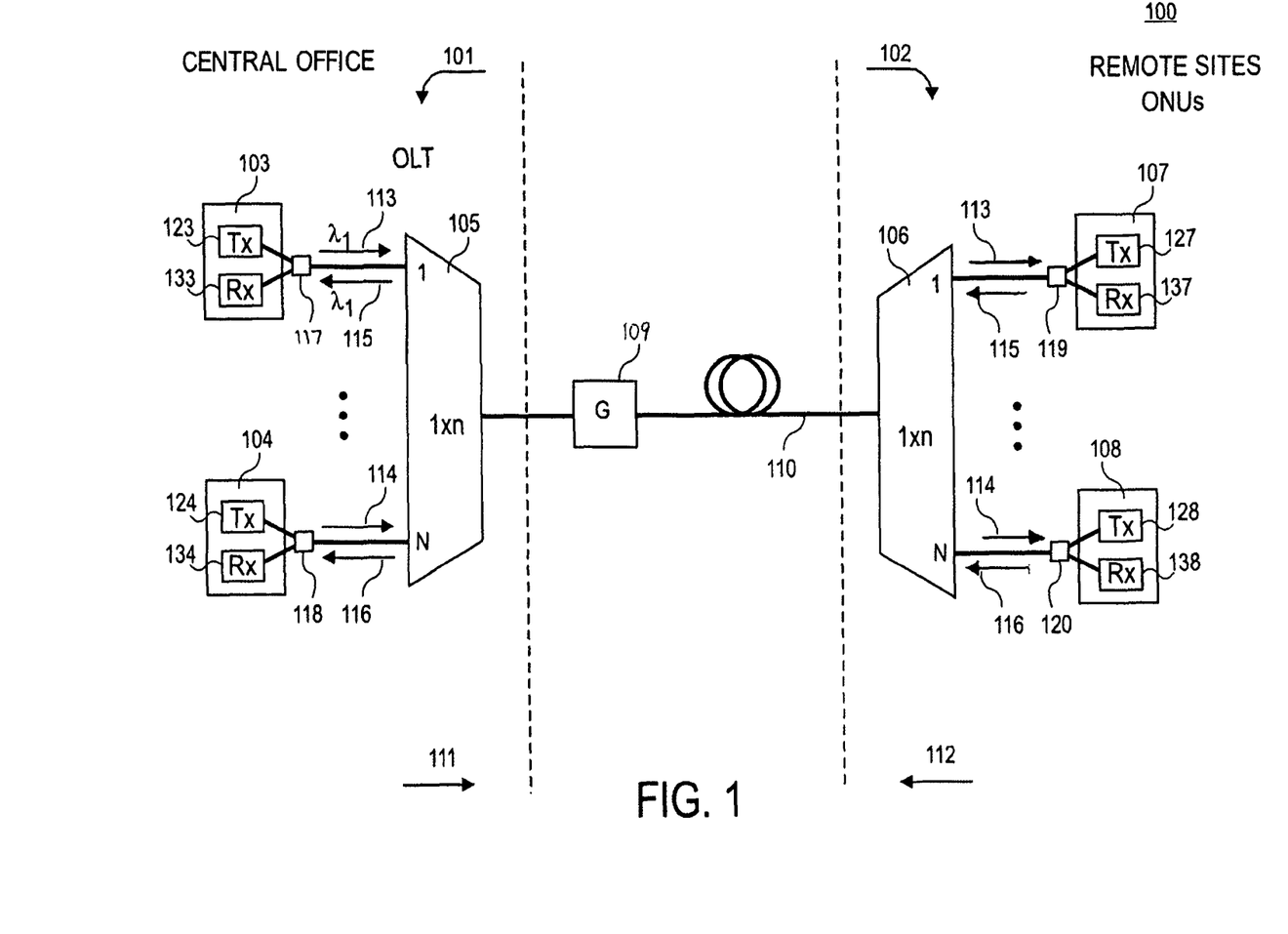
FIG. 1 shows one embodiment of a mutually wavelength-locked WDM-PON.

FIG. 1 shows one embodiment of a wavelength-locked WDM-PON 100. WDM PON 100 provides an optical point-to-point communication between an Optical Line Termination ("OLT") at a Central Office ("CO") 101 and Optical Network Units ("ONUs") at remote sites 102. As shown in FIG. 1, OLT at CO 101 has one or more transceivers that transmit the optical signals in down stream direction 111 to remote sites 102 and receive the optical signals in up stream direction 112 from ONUs at remote sites 102. As shown in FIG. 1, ONUs at remote sites 102 have one or more transceivers. The transceivers at the remote sites 102 transmit the optical signals in up stream direction 112 and receive optical signals in down stream direction 111.

As shown in FIG. 1, a transceiver 103 at CO 101 transmits a set 113 of one or more optical signals in down stream direction 111 and receives a set 115 of one or more optical signals transmitted in up stream direction 112 along one wavelength channel. A transceiver 104 transmits a set 114 of one or more optical signals in down stream direction 111 and receives a set 116 of one or more optical signals transmitted in up stream direction 112 along another wavelength channel. As shown in FIG. 1, a transceiver 107 at remote sites 102 transmits set 115 of one or more optical signals in up stream direction 112 and receives set 113 of one or more optical signals transmitted in down stream direction 111 along one wavelength channel. A transceiver 108 at remote sites 102 transmits set 116 of one or more optical signals in up stream direction 112 and receives set 114 of one or more optical signals transmitted in down stream direction 111 along another wavelength channel. For one embodiment, the optical signals propagating in down stream direction 111 and the optical signals propagating in up stream direction 112 are in a single wavelength band, e.g., in C-band (1530 nm~1560 nm). Examples of other wavelength bands may be E-band (1420 nm~1450 nm), L-band (1570 nm~1600 nm), O-band (1300 nm~1330 nm), S-band (1490 nm~1520 nm), and the like.

One or more transceivers at CO 101 and one or more transceivers at remote sites 102 are wavelength locked to each other through a mutual injection process, as described in further detail below. As shown in FIG. 1, transceivers 103-104, 107-108 have transmitters Tx 123, 124, 127, and 128 respectively. For one embodiment, each of the transmitters Tx 123, 124, 127, and 128 includes a wavelength-locked light source, for example, a Fabry-Perot semiconductor laser diode, a reflective semiconductor optical amplifier ("RSOA"), a vertical cavity laser, or any other light source that is capable of gain saturation within a data transmission bandwidth. The gain saturation of the light source means that any fluctuations in the injected input power are substantially reduced in the reflected output power. For one embodiment, when the light source operates in the gain saturation condition, the intensity fluctuations of the injected input power are reduced in the reflected output power by more than 2 dB. For one embodiment, a wavelength-locked light source of the transmitter Tx is a Fabry-Perot semiconductor laser diode with an anti reflection ("AR") coating on the front facet of the semiconductor laser diode. For one embodiment, each of transmitters Tx 123, 124, 127, and 128 is configured to operate below a lasing threshold when its gain is being suppressed by an injected spectral light signal.

For one embodiment, each of the transmitters Tx 123, 124, 127, and 128 includes an electrical data modulator (not shown) coupled to the wavelength locked light source (not shown) to modulate the sets of optical signals to transmit data. For one embodiment, each of transmitters Tx 123, 124, 127, and 128 includes a gain pump (not shown) to supply a bias current to the light source. For one embodiment, the bias current cooperates with a modulated data current signal provided by the data modulator to modulate the set of one or more optical signals to transmit optical data signals. The data signals may be transmitted at a high data speed, e.g., 125 Megabits per second ("Mbps"), 155 Mbps, 622 Mbps, 1.25 Gigabits per second ("Gbps"), 2.5 Gbps, 10 Gbps, and 40 Gbps. For one embodiment, transceivers at CO 101 and transceivers at remote sites 102 are designed to be identical.

Each of the wavelength-locked transceivers at CO 101 is configured to transmit optical data signals, and to receive injection optical signals from respective wavelength-locked transceivers at remote sites 102. Each of the transceivers at remote sites 102 is configured to transmit optical data signals, and to receive injection optical signals from respective wavelength-locked transceivers at CO 101. As shown in FIG. 1, transceivers 103-104, and 107-108 have receivers Rx 133-134, and 137-138 respectively, to receive the optical signals. For one embodiment, receiver Rx includes a photodetector. For one embodiment, the wavelength-locked light source of the transmitter Tx includes a reflective modulator capable of gain saturation within a data transmission bandwidth to reduce the intensity noise within the electrical bandwidth of the receiver Rx. For one embodiment, the wavelength-locked light source of the transmitter Tx has a response time of the gain saturation of the same order of magnitude or shorter than a time period of the data modulation. In other words, the wavelength-locked light source of transmitter Tx has a saturation frequency response that is above or approximately equal to a data modulation bandwidth. For example, if the data modulation bandwidth is about 5 GHz, the saturation frequency response is higher or approximately equal to 5 GHz. For one embodiment, the response time of the wavelength-locked light source of the transmitter Tx is less than 1 nanosecond ("nsec").

For one embodiment, a wavelength-locked light source of the transmitter Tx has a substantially low saturation power, e.g., on the order of 10 milliwatts or less.

For one embodiment, a wavelength-locked light source of the transmitter Tx operates in a saturated gain condition to overcome the intensity noise on the injected data signals. In the saturated gain condition, input intensity fluctuations on the injection signal can be reduced through the gain saturation of the Tx. For one embodiment, the wavelength-locked light source of the transmitter Tx operates in the gain saturated condition, such that the intensity fluctuations of the injection signal are reduced by more than 2 dB. For one embodiment, the wavelength-locked light source of the transmitter Tx saturates within a bit time of the optical data signal.

Intensity noise in the injection data signal may be caused by, e.g., residual data modulation of the signal in one direction being imparted onto the re-modulated signal in the opposite direction, noise from reflections in the system that interfere with the data signal, and noise due to the mutual locking process of the two transmitters Tx.

For one embodiment, to overcome the intensity variations on the injection data signal, the extinction ratio between the zero and one bits of the modulated optical signal (data signal) produced by the transmitter Tx is such that a sufficient injection signal is provided even during the zero bit to provide wavelength-locking of another transmitter Tx. For one embodiment, the extinction ratio of the data signal is in the approximate range of 2 dB to 10 B depending on the level of saturation of the wavelength-locked light source of the transmitter Tx. For example, if the extinction ratio is 10 dB, about 10% of the injection data signal is provided during the zero bit which can be sufficient to wavelength-lock the other transmitter Tx. It is noted that the bigger extinction ratio may require a larger saturation effect to reduce the larger intensity variations. For one embodiment, the extinction ratio of the optical data signal is between about 3 dB and about 5 dB.

For one embodiment, to reduce the effects of intensity noise, Forward Error Correction ("FEC") codes are used. For one embodiment, using FEC improves bit error rate ("BER") of the data signal due to the intensity noise from being greater than $10^{-4}$ to being less than $10^{-9}$. FEC codes are known to one of ordinary skill in the art of telecommunication.

For one embodiment, to remove the effects of modulation on the transmitted data signal in one direction that causes the noise in the opposite direction, various modulation schemes can be employed. For example, a frequency shift modulation ("FSK") or phase shift modulation ("PSK") of the optical signals produced by Tx can be used in one or both directions 111 and 112. For another embodiment, the dithering of the output wavelength produced by the transmitter Tx can be performed to reduce noise effects.

For one embodiment, to further reduce the noise effects, the reflectivity of the front facet for the RSOA of the wavelength locked transmitter Tx is less than $10^{-4}$. For one embodiment, the reflectivity of the front facet for the RSOA of the wavelength locked transmitter Tx is less than $10^{-5}$.

For one embodiment, the reflectivity of the front facet for the wavelength locked Fabry-Perot laser diode ("FPLD") of the transmitter Tx is in the approximate range of $10^{-4}$-$10^{-1}$. For one embodiment, the wavelength-locked FPLD of the transmitter Tx is wavelength controlled so that the longitudinal wavelength modes of the FPLD aligns with the wavelength channels. The wavelength channels can be defined by a WDM MUX/De-MUX that is coupled to the Tx, as described in further detail below. WDM MUX/De-MUXes can be realized using array waveguide (AWG) routers, thin film dielectric filters, diffraction gratings and other methods that are known in the art. For one embodiment, the modes of the wavelength-locked FPLD of Tx is controlled using the laser mode controller, e.g., a temperature controller. The temperature controller can be a thermo-electric cooler ("TEC") coupled to the FPLD of the transmitter Tx. For one embodiment, the laser mode controller is calibrated to keep the modes of the wavelength-locked light source of Tx aligned with International Telecommunication Union ("ITU") wavelength grid.

For one embodiment, mutually wavelength-locked transmitters Tx are polarization insensitive. For another embodiment, mutually wavelength-locked transmitters Tx operate using a single polarization.

As shown in FIG. 1, a wavelength division multiplexing ("WDM") multiplexer/de-multiplexer ("MUX/De-MUX") 105 and a WDM MUX/De-MUX 106 are coupled between one or more transceivers 103-104 at central office 101 and one or more transceivers 107-108 at remote sites 102. For one embodiment, the optical signals transmitted over WDM PON 300 along wavelength channels are spaced from each other according to standards of Dense Wavelength Division Multiplexing ("DWDM") technology, Coarse WDM ("CWDM") technology, or a combination of both. DWDM channel spacing and CWDM channel spacing is known to one of ordinary skill in the art of telecommunications.

As shown in FIG. 1, each of WDM MUX/De-MUXes 105 and 106 has wavelength channels 1 . . . N, where N may be 4, 8, 16, 32, 64, 128, or any other number. As shown in FIG. 1, transceiver 103 is coupled to wavelength channel 1 of WDM MUX/De-MUX 105 to transmit set 113 and receive set 115 that have wavelengths centered about $\lambda_1$. Transceiver 104 is coupled to wavelength channel N of WDM MUX/De-MUX 105 to transmit set 114 and receive set 116 that have wavelengths centered about $\lambda_N$. WDM MUX/De-Mux 105 multiplexes the optical signals propagating in down stream direction 111 to transmit through a transmission medium 110, e.g., an optical fiber. WDM MUX/e-MUX 105 de-multiplexes the optical signals propagating in up stream direction 112 over transmission medium 110. WDM MUX/De-MUX 106 multiplexes optical signals received in up stream direction 112 and de-multiplexes optical signals in down stream direction 111, as shown in FIG. 1. Transceiver 107 is coupled to wavelength channel 1 of WDM MUX/De-MUX 106 to transmit set 115 and receive set 113 that has a wavelength of about $\lambda_1$. Transceiver 108 is coupled to wavelength channel N of WDM MUX/De-MUX 106 to transmit set 116 and receive set 114 that has a wavelength of about $\lambda_N$.

As shown in FIG. 1, power splitters 117, 118, 119, and 120 are used to divide an optical power of the optical signals at each of transceivers 103, 104, 107, and 108. As shown in FIG. 1, each power splitter 117, 118, 119, and 120 splits the optical power of the respective set of one or more optical signals between the transmitter Tx and receiver Rx of the respective transceivers 103, 104, 107, and 108. The optical power from the transceiver at CO 101 is used to lock an output wavelength of the transceiver at remote sites 102. In the same time, the optical power from the transceiver at remote sites 102 is used to lock an output wavelength of the transceiver at CO 101. As shown in FIG. 1, power splitter 117 directs a portion of the optical power of set 115 to lock the output wavelength of transmitter Tx 123. Power splitter 118 directs a portion of the optical power of set 114 to lock the output wavelength of transmitter Tx 124. Power splitter 119 directs a portion of the optical power of set 113 to lock the output wavelength of transmitter Tx 127. Power splitter 120 directs a portion of the optical power of set 114 to lock the output wavelength of transmitter Tx 128. For one embodiment, the power splitter directs more optical power to transmitters Tx than to receivers Rx to assist in the wavelength-locking process. For one embodiment, power splitter 117 directs to Tx 123 between about 50% to about 95% of the total optical power of set 115 of the optical signals.

A transceiver at a central office 101 is coupled to a respective transceiver at remote sites 102 through the same wavelength channel of the MUX/De-MUXes 105 and 106. As shown in FIG. 1, transceiver 103 and 107 are connected to the same wavelength channel 1 of WDM MUX/De-MUXes 105 and 106 and operate at a substantially the same wavelength $\lambda_1$. Transceiver 104 and 108 are connected to the same wavelength channel N of WDM MUX/De-MUXes 105 and 106 and operate at substantially the same wavelength $\lambda_N$.

As shown in FIG. 1, set 115 of optical signals from transmitter 127 includes an injection signal to lock transmitter 123 to operate at the wavelength of about $\lambda_1$, and set 113 of optical signals from transmitter 123 includes an injection signal to lock transmitter 127 to operate at the wavelength of about $\lambda_1$. As shown in FIG. 1, set 116 of optical signals from transmitter 128 includes an injection signal to lock transmitter 124 to operate at the wavelength of about $\lambda_N$, and set 114 of optical signals from transmitter 124 includes an injection signal to lock transmitter 128 to operate at the wavelength of about $\lambda_N$. That is, one or more OLT transceivers at CO 101 and one or more ONU transceivers at remote sites 102 coupled to the same wavelength channel of the WDM MUX/De-MUX are automatically wavelength locked to each other through the mutual injection process. For one embodiment, a time delay of about a millisecond may occur before transceivers at CO 101 and transceivers at remote sites 102 mutually lock to each other due to the propagation time delay between the two transceivers.

For one embodiment, WDM MUX/De-MUXes 105 and 106 include Arrayed Waveguide Grating ("AWG") Multiplexers/Demultiplexers. For another embodiment, WDM MUX/De-MUXes 105 and 106 include thin film dielectric filters. For another embodiment, WDM MUX/De-MUXes 105 and 106 include wavelength diffraction gratings. For one embodiment, each of WDM MUX/De-MUXes 105 and 106 has the optical spacing between adjacent optical channels in the approximate range of 10 GHz to 200 GHz.

For one embodiment, each of the wavelength channels of AWG MUX/De-MUX 105 and 106 transmits wavelengths from the same wavelength band in two opposite directions for a bi-directional communication. For one embodiment, the MUX/DMUXes 105 and 106 have the spacing between optical channels less than 10 nm. For one embodiment, WDM-MUX/De-MUXes 105 and 106 are matched AWG MUX/De-MUXes. For one embodiment, the wavelength of WDM MUX/De-MUX channels does not significantly change with the temperature. That is, each of the WDM-MUX/De-MUXes 105 and 106 is temperature insensitive ("athermal"), and does not need an active temperature control. Athermal WDM-MUX/De-MUXes are known to one of ordinary skill in the art of telecommunications.

As shown in FIG. 1, an in-line gain element 109 is coupled to transceivers at central office 101 and remote sites 102. As shown in FIG. 1, in-line gain element 109 is coupled to WDM MUX/De-MUX 105 to amplify the data signals in all wavelength channels (e.g., 4, 8, 16, 32, 64, 128, and the like) transmitted through the optical transmission medium 110, e.g., optical fiber, in a single wavelength band, e.g., C-band, in both directions 111 and 112. For one embodiment, in-line gain element 109 has such gain saturation characteristics that its saturation response time is much slower than the transmission data rates between CO 101 and remote sites 102. In-line gain element 109 provides optical gain to the data signals but preserves the intensity modulation of the data signal and avoids crosstalk due to multiple data streams being simultaneously amplified.

For one embodiment, in-line gain element 109 has a slow saturation response time e.g., longer than 1 microsecond ("µsec") compared to the data rate of the transmission signals. For one embodiment, in-line gain element 109 has a response time in the approximate range of 1 µsec to 10 msec. In-line gain element 109 provides an extended reach WDM-PONs where the distances between CO 101 and remote sites 102 can exceed 20 km.

For one embodiment, in-line gain element 109 is an Erbium Doped Fiber Amplifier ("EDFA"). For another embodiment, in-line gain element 109 is a Raman Amplifier. For yet another embodiment, in-line gain element 109 is a semiconductor optical amplifier ("SOA"). For yet another embodiment, gain element 109 includes any combination of EDFA, Raman Amplifier, and SOA. For one embodiment, gain element 109 is located at CO 101. For another embodiment, gain element 109 is placed anywhere between MUX/De-MUX 105 and MUX/De-MUX 106 so that a single gain element can be used to amplify all wavelength channels. For example, a section of EDFA fiber can be placed at a remote node WDM MUX/De-MUX 106 so that data signals of all wavelength channels are amplified remotely from CO 101. For another embodiment, gain element 109 is distributed gain element, e.g., a Raman Amplifier. The Raman Amplifier can distribute the gain along the transmission fiber, as known to one of ordinary skill in the art of telecommunication.

For one embodiment, in-line gain element 109 provides a single-pass gain so that the total round-trip gain through the WDM PON 100 is equal to about unity. That is, a single-pass gain value for in-line gain element 109 is such that a total transmission loss of the optical power between mutually locked transceivers 103 and 107 is compensated. For one embodiment, the total transmission loss between mutually locked transceivers 103 and 107 includes the loss of each WDM-MUX/De-MUXes 105 and 106, the loss of each of power splitters 117 and 119, and the loss of optical transmission medium 110. For one embodiment, each of wavelength-locked Tx can provide a reflective gain of about 6 dB. To calculate the gain value for the in-line gain element, the reflective gain of the Txs is subtracted from the total transmission loss. For example, if total transmission loss between mutually locked transmitters Tx is about 18 dB, and the reflective gain of the mutually locked transmitters Tx is about 6 dB, the in line gain value can be 12 dB. For one embodiment, the gain of the in-line gain element 109 is in the approximate range of 3 dB to 20 dB.

For one embodiment, respective transceivers at CO 101 and at remote sites 102 saturate each other due to mutual wavelength locking process so all transceivers operate at a substantially constant output power to overcome the differential losses of the system 100.

For one embodiment, MUX/De-MUX 105, and in-line gain element 109 are integrated into a single Integrated Optical Chip ("IOC"), e.g., an Indium Phosphide ("InP") chip. For another embodiment, all elements located at CO 101 (transceivers 103-104, power splitters 117-118, gain block 109, e.g., SOA, MUX/De-MUX 105, e.g., AWG) are integrated into a single InP chip. For one embodiment, all transmitters Tx located at CO 101 are integrated into an array on a single IOC. For one embodiment, all receivers Rx located at CO 101 are integrated into an array on a single IOC. For another embodiment, a transmitter Tx and a MUX/De-MUX 105 located at CO 101 are integrated into a single IOC. For another embodiment, power splitter 117 and transceiver 103 at CO 101 are integrated into a single IOC. For another embodiment, elements at CO 101 are integrated onto separate IOCs with arrays of Rx and Tx, or other combination of the elements WDM PON 100 can be provided on separate IOCs. For one embodiment, power splitter 119 and transceiver 107 of an ONU at a remote site are integrated into a monolithic InP IOC.

For one embodiment, fiber connectors that reduce reflections are used to connect the elements of the system 100. For example, angled physical contact ("APC") fiber connectors can be used to connect transceivers 103 and 104, WDM MUX/De-MUXes 105 and 106, gain element 109, optical transmission medium 110, and transceivers 107 and 108. For one embodiment, a combination of fusion splices and low reflectivity connectors are used to connect the elements of system 100.

Figure 2:
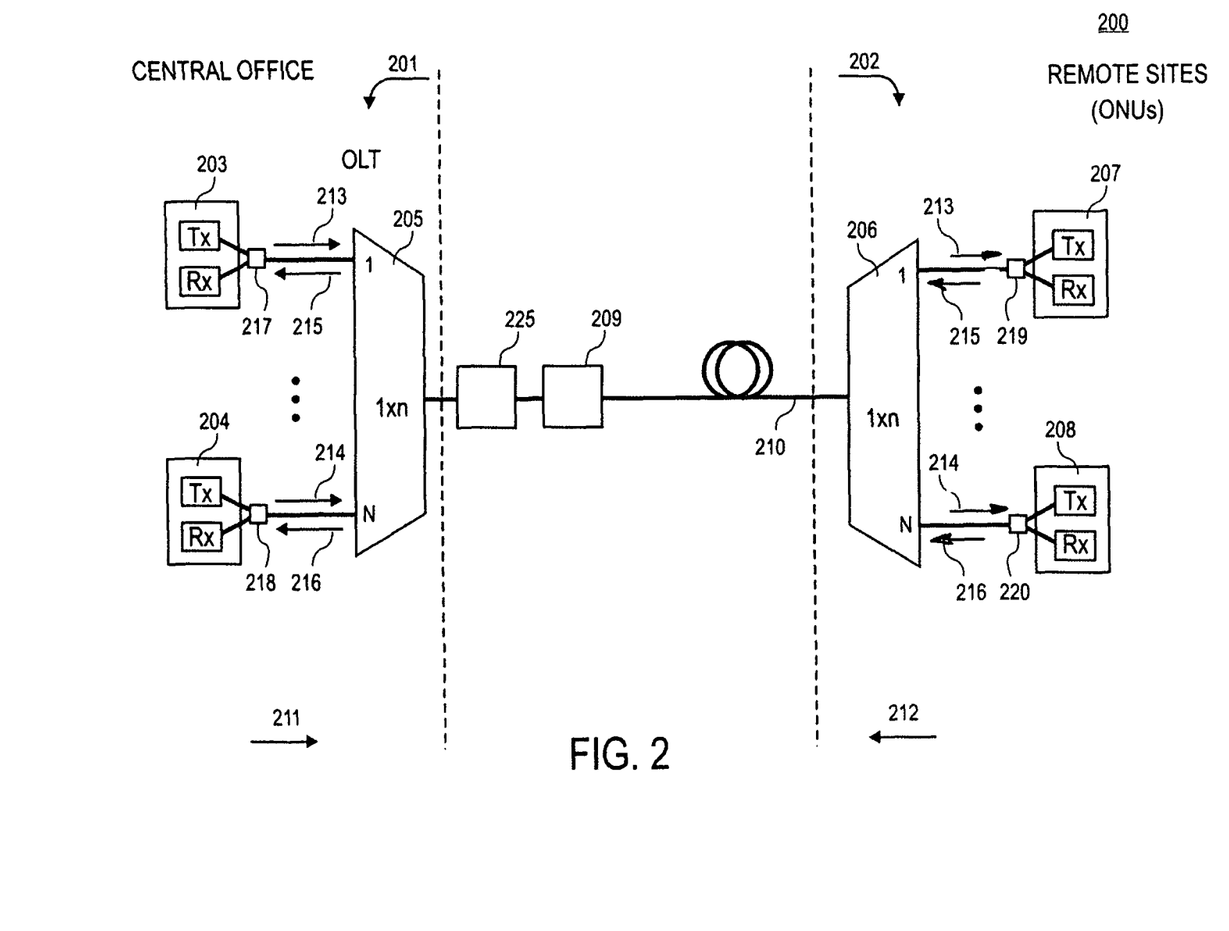
FIG. 2 shows another embodiment of a mutually wavelength-locked WDM-PON that includes an in-line scrambling element ("scrambler")

FIG. 2 shows another embodiment of a wavelength-locked WDM-PON 200 that includes an in-line scrambling element ("scrambler"). FIG. 2 is similar to FIG. 1, with the addition of an in-line scrambler 225. As shown in FIG. 2, wavelength-locked WDM-PON 200 includes one or more wavelength-locked transceivers coupled to a WDM MUX/De-MUX 205 at CO 201, as described above with respect to FIG. 1. An in-line gain element 209 is coupled between MUX/De-MUX 205 and MUX/De-MUX 206 to amplify optical signals through all wavelength channels that are transmitted in both directions 211 and 212 over a transmission medium 210, as described above with respect to FIG. 1. As shown in FIG. 2, wavelength channels of WDM MUX/De-MUX 206 are coupled to one or more transceivers of ONUs at remote sites 202, as described above. Power splitters 217, 218, 219, and 220 are provided to split the optical power between transmitters Tx and receivers Rx, as described above. The optical power of the data signal 215 from remote transceiver 207 coupled to wavelength channel 1 locks the wavelength of the transceiver 203 at CO 201 coupled to wavelength channel 1. The optical power of the data signal 213 from transceiver 203 at CO 201 coupled to wavelength channel 1 locks the wavelength of the transceiver 207 at remote sites 202 coupled to wavelength channel 1. The optical power of the data signal 216 from remote transceiver 208 coupled to wavelength channel N locks the wavelength of the transceiver 204 at CO 201 coupled to the wavelength channel N. The optical power of the data signal 214 from transceiver 204 at CO 201 coupled to wavelength channel N locks the wavelength of the transceiver 208 at remote sites 202 coupled to wavelength channel N. That is, the wavelength-locked transceivers at CO 201 and wavelength-locked transceivers at remote sites 202 that are coupled through the same wavelength channel, are wavelength-locked to each other using mutual injection process, as described above.

In-line scrambler 225 is coupled between WDM MUX/De-MUX 205 and WDM MUX/De-MUX 206. In-line scrambler 225 is used to scramble polarization of the optical data signals propagating between CO 201 and remote sites 202, optical frequency of the optical data signals propagating between CO 201 and remote sites 202, or both. For one embodiment, scrambler 225 depolarizes the optical data signals propagating between CO 201 and remote sites 202 by scrambling the polarization. This is useful if the wavelength-locked transmitters Tx at CO 201 and the wavelength-locked transmitters at remote sites 202 are polarization sensitive. For one embodiment, scrambler 225 is a passive device that uses time delays between orthogonal polarization states to scramble the polarization. For another embodiment, scrambler 225 is an active device that varies the polarization state of the optical signals as a function of time, e.g., a LiNbO3 modulator, or any other electro-optical device.

For one embodiment, scrambler 225 performs scrambling or "dithering" of the optical frequency as a function of time. This is useful to reduce the effects of intensity noise from the mutual wavelength-locking process or from reflection along the communication link. For one embodiment, the optical frequency is dithered quickly, relative to the bit period of data signal. For one embodiment, scrambler 225 is a LiNbO3 modulator, or any other electro-optical device that performs polarization scrambling, frequency scrambling, or both.

For one embodiment, scrambler 225 dithers the optical signal frequency such that the frequencies of the noise in the signals caused, e.g., by reflections, interference and beating between the signals, spread out to the frequencies outside the electrical bandwidth of the receiver Rx.

For one embodiment, MUX/De-MUX 205, in-line gain element 209, and scrambler 225 are integrated into a single Integrated Optical Chip ("IOC"), e.g., an Indium Phosphide ("InP") chip. For one embodiment, all transmitters Tx located at CO 201 are integrated into an array on a single IOC. For one embodiment, all receivers Rx located at CO 201 are integrated into an array on a single IOC. For another embodiment, a transmitter Tx and a MUX/De-MUX 205 located at CO 201 are integrated into a single IOC. For another embodiment, power splitter 217 and transceiver 203 at CO 201 are integrated into a single IOC. For another embodiment, all elements located at CO 201 (transceivers 203-204, power splitters 217-218, gain element 209, scrambler 225) are integrated into a single InP chip. For another embodiment, elements at CO 101 are integrated onto separate IOCs with arrays of Rx and Tx, or other combination of the elements WDM PON 200 can be provided on separate IOCs. For one embodiment, power splitter 219 and transceiver 207 of an ONU at a remote site are integrated into a monolithic InP IOC.

Figure 3:
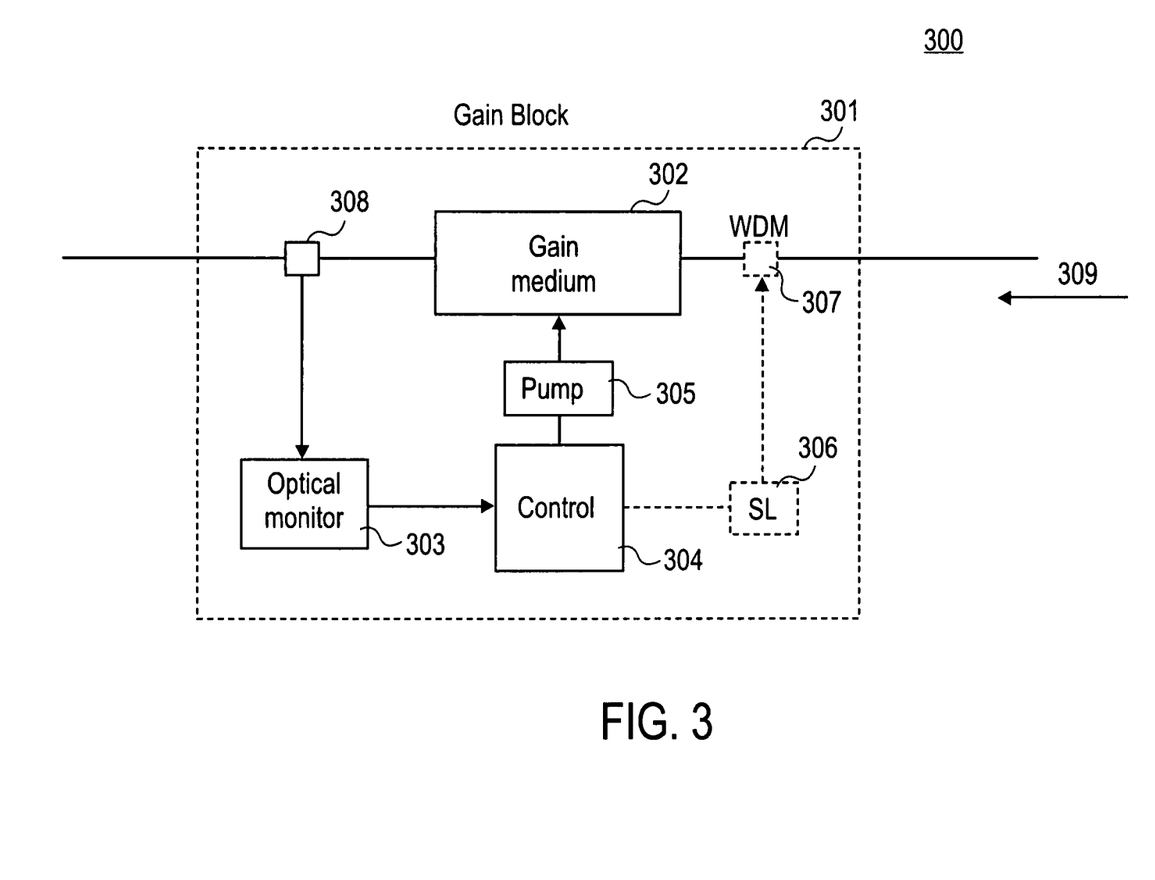
FIG. 3 shows one embodiment of an in-line gain element having a feedback mechanism.

FIG. 3 shows one embodiment of an in-line gain element having a feedback mechanism. Because the transmission losses of the WDM PON depend on various factors, e.g., drop fibers, connector losses, the length of the an optical feeder fiber, the amount of gain required to transmit optical signals between the CO and remote sites can vary with each installation. To adjust to these conditions, in-line gain block 300 has a feedback mechanism to automatically adjust its gain. As shown in FIG. 3, the feedback mechanism includes an optical monitor 303 that is coupled to in-line gain medium 302 to detect optical data signals propagating through WDM channels to gain block 300. As shown in FIG. 3, optical monitor 303 is coupled to control the gain of the gain medium 302. For one embodiment, optical monitor 303 is coupled to control element 304 to control pumping of the gain medium 302 by pump 305, as shown in FIG. 3. As shown in FIG. 3, optical monitor 303 is coupled to gain medium using a tap 308 to tap optical data signals propagating through gain medium 302 in direction 309. For one embodiment, direction 309 is an upstream direction for transmitting optical data signals from remote sites to a central office. For another embodiment, direction 309 is a down stream direction for transmitting optical data signals from a central office to remote sites. As shown in FIG. 3, optical splitter 308 provides a portion of optical data signals propagating in direction 309 through gain medium 302 to optical monitor 303. As shown in FIG. 3, control element 304 coupled to optical monitor 303 causes pump 305 to dynamically adjust the gain of gain medium 302 depending on the strength (e.g., amplitude, intensity, power) of optical data signals detected by optical monitor 303. For one embodiment, if the optical data signals detected by optical monitor 303 are smaller than a predetermined threshold, control element 304 causes pump 305 to increase the gain of gain medium 302. If the optical data signals detected by optical monitor 303 are larger than a predetermined threshold, control element 304 causes pump 305 to decrease the gain of gain medium 302. For another embodiment, other controlling schemes for operation of control element 304 with pump 305 can be used that are known to one of ordinary skill in the art. For one embodiment, optical monitor 303 includes a photodetector. For another embodiment, optical monitor 303 includes an optical channel monitor to measure the optical power in each wavelength channel.

For another embodiment, a saturating laser "SL" 306 can be used to control gain of gain medium 302, as shown in FIG. 3. Saturating laser 306 sends a saturating optical signal through WDM coupler 307 into gain medium 302. The gain of gain medium 302 can be controlled by adjusting the output power of the saturating laser 306. For another embodiment, as shown in FIG. 3 by dashed lines, control element 304 coupled to optical monitor 303 dynamically adjusts the output power of saturating laser 306 depending on the strength (e.g., amplitude, intensity, power) of optical data signals detected by optical monitor 303. The gain of gain medium 302 is adjusted depending on the output power of the saturating laser 306. For another embodiment, if the optical data signals detected by optical monitor 303 are smaller than a predetermined threshold, control element 304 causes saturating laser 306 to increase the optical gain of the gain medium 302. If the optical data signals detected by optical monitor 303 are larger than a predetermined threshold, control element 304 causes saturating laser 306 to decrease the optical gain of the gain medium 302. For another embodiment, other controlling schemes for operation of control element 304 with saturating laser 306 can be used that are known to one of ordinary skill in the art. For another embodiment, the wavelength of the saturating laser 306 is different from the wavelength of any of the optical data channels.

For one embodiment, pump control, saturating laser control, or both can be used to control the gain of the in-line gain element.

Figure 4:
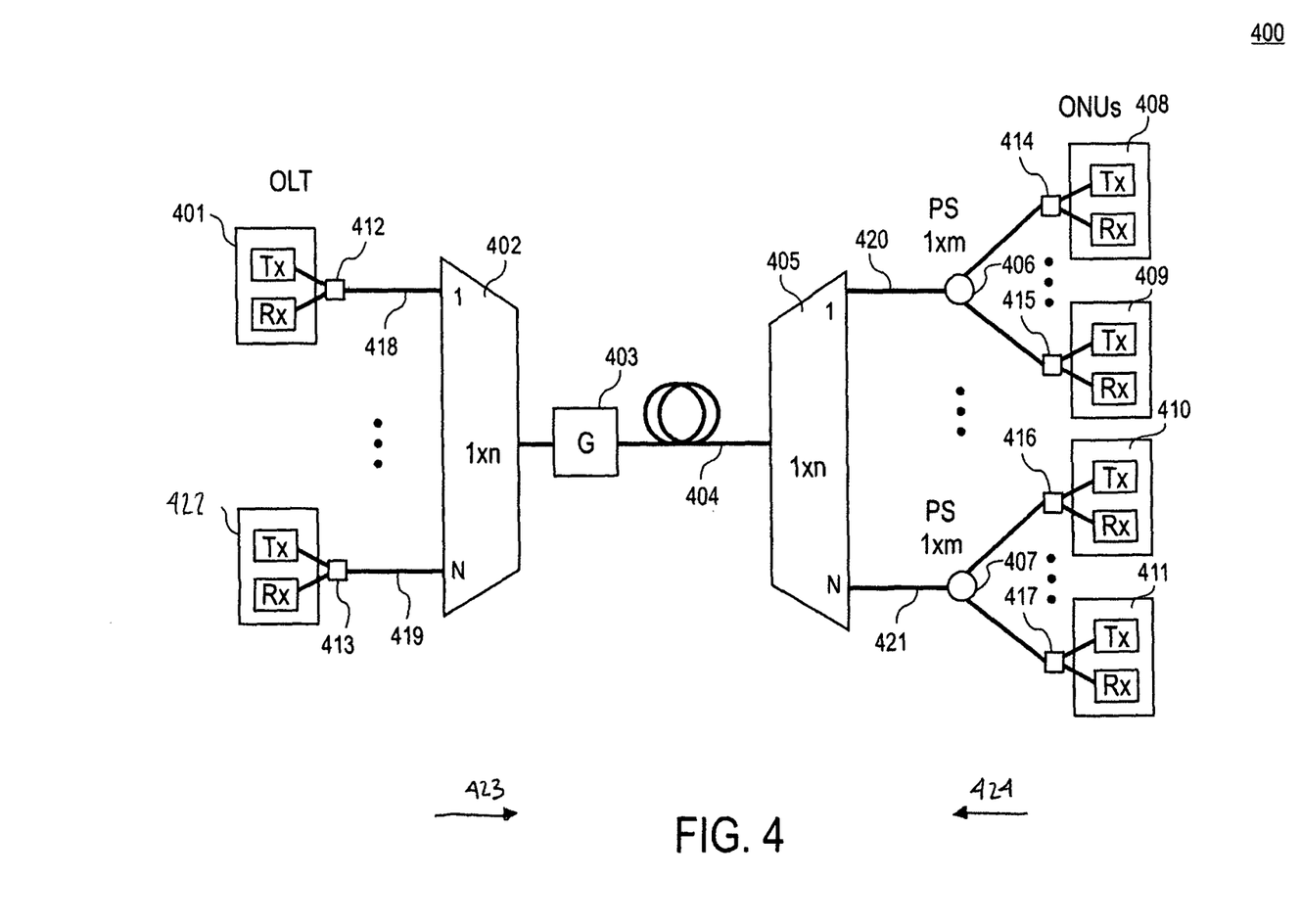
FIG. 4 shows one embodiment of a hybrid system 400 that uses both WDM and TDM schemes to service many ONUs from a single PON.

FIG. 4 shows one embodiment of a hybrid system 400 that uses both WDM and TDM schemes to service many ONUs from a single PON. Instead of providing a single wavelength to each of ONUs at remote sites, a remote power splitter is used to route sets of one or more optical signals to multiple transceivers using a Time-Division Multiplexing ("TDM") scheme. As shown in FIG. 4, hybrid system 400 includes one or more transceivers 401 at OLT at a Central Office that are coupled to WDM MUX/De-MUX 402, as described above with respect to FIGS. 1 and 2. As shown in FIG. 4, in-line gain element 403 is coupled to WDM MUX/De-MUX 402 to amplify signals transmitted through a transmission medium 404, e.g., an optical fiber, to WDM MUX/De-MUX 405 at a remote location, as described above with respect to FIGS. 1-3. As shown in FIG. 4, transceivers at ONUs are coupled to wavelength channels of WDM MUX/De-MUX 405. As shown in FIG. 4, one transceiver 401 is coupled to transmit a set of one or more optical signals in a down stream direction and receive a set of one or more optical signals transmitted in an up stream direction along wavelength channel 1 of WDM MUX/De-MUX 402. Another transceiver 422 is coupled to transmit a set of one or more optical signals in the down stream direction and receive a set of one or more optical signals transmitted in the up stream direction along wavelength channel N of WDM MUX/De-MUX 402. As shown in FIG. 4, transceivers 408 and 409 of ONUs at remote sites are coupled through splitter 406, e.g., a power splitter, to wavelength channel 1 of WDM MUX/De-MUX 405. Splitter 406, e.g., a power splitter, is used to split the optical power of optical signals propagating along a wavelength channel between multiple ONUs, so that a single wavelength channel can be time shared by multiple ONUs.

As shown in FIG. 4, transceivers 410 and 411 of ONUs at remote sites are coupled to through router 407, e.g., a power splitter, to wavelength channel n of WDM MUX/De-MUX 405. Each of transceivers 408 and 409 at remote sites transmits a set of one or more optical signals in the up stream direction and receives a set of one or more optical signals transmitted in the down stream direction along wavelength channel 1, as shown in FIG. 4. Each of transceivers 410 and 411 at remote sites transmits a set of one or more optical signals in the up stream direction and receives a set of one or more optical signals transmitted in the down stream direction along wavelength channel n. For one embodiment, the optical signals propagating in down stream direction 423 and the optical signals propagating in up stream direction 424 are in a single wavelength band, as described above. Transceivers 401 at OLT and transceivers at remote sites that are coupled to the same wavelength channel of WDM MUX/De-MUXes 402 at OLT and 405 at a remote site are wavelength locked to each other through a mutual injection process, as described above with respect to FIGS. 1-2. For one embodiment, each of WDM MUX/De-MUXes 402 at OLT and 405 at a remote site has 4, 8, 16, 32, or any other number of wavelength channels. For one embodiment, the splitter coupled between a wavelength channel of WDM MUX/De-MUX 405 at a remote site and transceivers at ONUs is a power splitter that splits the optical power in a ratio of 1×4, 1×8, 1×16, 1×32, or in any other power splitting ratio. For one embodiment, all ONUs have transceivers that are designed to be identical. As shown in FIG. 4, in-line gain element 403 is coupled to WDM MUX/e-MUX 402 to amplify the data signals in all wavelength channels transmitted through optical transmission medium 404, e.g., an optical fiber, in both directions, as described above. For one embodiment, in-line gain element 403 is configured to compensate for the total transmission loss of the optical power of the optical data signals between mutually locked transceivers at the OLT and the remote sites including the loss of the splitters. To control the time sharing of a single wavelength channel between the multiple users, standardized protocols, e.g., IEEE Ethernet Passive Optical Network (EPON) protocol, Full Service Access Network Gigabit Passive Optical Network (FSAN GPON) protocol, Broadband Passive Optical Network ("BPON"), or any combination thereof can be used.

For one embodiment, MUX/De-MUX 402, and in-line gain element 403 are integrated into a single Integrated Optical Chip ("IOC"), e.g., an Indium Phosphide ("InP") chip. For one embodiment, all transmitters Tx located at OLT are integrated into an array on a single IOC. For one embodiment, all receivers Rx located at OLT are integrated into an array on a single IOC. For one embodiment, a transmitter Tx and a MUX/De-MUX 402 located at OLT are integrated into a single IOC. For another embodiment, power splitter 412 and transceiver 103 at OLT are integrated into a single IOC. For another embodiment, all elements located at OLT (transceivers, power splitters, the gain block) are integrated into a single InP chip. For another embodiment, elements at OLT are integrated onto separate IOCs with arrays of Rx and Tx, or other combination of the elements WDM PON 400 can be provided on separate IOCs. For one embodiment, power splitters 406, 407 and MUX/De-MUX 405 at a remote site are integrated into a monolithic InP IOC. For one embodiment, transceiver 408 and power splitter 414 of an ONU at a remote site are integrated into a monolithic InP IOC.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. An apparatus, comprising:
a first transceiver to transmit a first set of optical signals in a first direction along a first wavelength channel; and
a second transceiver coupled to the first transceiver to transmit a second set of optical signals along the first wavelength channel in a second direction opposite to the first direction, wherein the first transceiver is wavelength locked using the second set of optical signals from the second transceiver and the second transceiver is wavelength locked using the first set of optical signals from the first transceiver, wherein the first transceiver saturates gain within a first response time to output the first set of optical signals, wherein the first response time is of the same order of magnitude or shorter than a first time period of data modulation onto the second set of optical signals to remove effects of the data modulation in the second direction that cause noise in the first direction, and the second transceiver saturates gain within a second response time to output the second set of optical signals, wherein the second response time is of the same order of magnitude or shorter than a second time period of the data modulation onto the first set of optical signals to remove effects of the data modulation in the first direction that cause noise in the second direction, wherein the first transceiver and the second transceiver are mutually saturated due to wavelength locking.

2. The apparatus of claim 1, further comprising:
a wavelength division multiplexing ("WDM") multiplexer/de-multiplexer ("MUX/De-MUX") coupled between the first transceiver and the second transceiver.

3. The apparatus of claim 1, further comprising:
an in-line gain element coupled to the first transceiver.

4. The apparatus of claim 1, further comprising:
a scrambler coupled to the first transceiver.

5. The apparatus of claim 1, wherein the transceiver is to operate in a saturated gain condition.

6. The apparatus of claim 1, wherein the transceiver includes a light source that is a Fabry-Perot laser, a reflective semiconductor optical amplifier, or a vertical cavity laser.

7. The apparatus of claim 1, wherein the transceiver is polarization insensitive.

8. The apparatus of claim 1, wherein the first transceiver and the second transceiver are designed to be identical.

9. A system, comprising:
a first wavelength division multiplexing multiplexer/de-multiplexer ("WDM MUX/De-MUX") having a first wavelength channel;
a first transceiver to send a first set of optical signals in a first direction along the first wavelength channel;
a gain element coupled to the WDM MUX/De-MUX; and
a second transceiver coupled to the gain element to send a second set of optical signals in a second direction along the first wavelength channel, wherein the second direction is opposite to the first direction, wherein the first transceiver is wavelength locked using the second set of optical signals, and the second transceiver is wavelength locked using the first set of optical signals, and wherein the first transceiver saturates gain within a first response time to output the first set of optical signals, wherein the first response time is of the same order of magnitude or shorter than a first time period of data modulation onto the second set of optical signals to remove effects of the data modulation in the second direction that cause noise in the first direction and the second transceiver saturates gain within a second response to output the second set of optical signals time, wherein the second response time is of the same order of magnitude or shorter than a second time period of the data modulation onto the first set of optical signals to remove effects of the data modulation in the first direction that cause noise in the second direction, wherein the first transceiver and the second transceiver are mutually saturated due to wavelength locking.

10. The system of claim 9, further comprising
a monitor to monitor an optical power of the second set of the optical signals to control the gain element.

11. The system of claim 9, further comprising
a scrambler coupled to the WDM MUX/De-MUX to scramble an optical frequency, an optical polarization, or both.

12. The system of claim 9, wherein the first transceiver is wavelength locked using an optical power of the second set of the optical signals, and the second transceiver is wavelength locked using an optical power of the first set of the optical signals.

13. The system of claim 9, wherein each of the first transceiver and the second transceiver is to operate in a saturated gain condition.

14. The system of claim 9, further comprising
a first power splitter coupled to the first transceiver to split an optical power of the second set of the optical signals; and
a second power splitter coupled to the second transceiver to split the optical power of the first set of the optical signals.

15. The system of claim 14, wherein the first transceiver and the first power splitter are integrated into an optical chip.

16. The system of claim 9, wherein the gain element is an Erbium Doped Fiber Amplifier ("EDFA"), a Raman Amplifier, a semiconductor optical amplifier ("SOA"), or any combination thereof.

17. The system of claim 9, wherein the transceiver is polarization insensitive.

18. The system of claim 9, further comprising
a second WDM MUX/De-MUX coupled to the gain element;
a third transceiver coupled to the second WDM MUX/De-MUX, and
a third power splitter coupled to the second WDM MUX/De-MUX to send the first set of the optical signals along the first wavelength channel to the second transceiver and the third transceiver using a Time-Division Multiplexing ("TDM") scheme.

19. The system of claim 9, wherein the first WDM MUX/De-MUX and the gain element are integrated into an optical chip.

20. The system of claim 9, wherein a first transmitter of the first transceiver and a second transmitter of the second transceiver are integrated into an array on an optical chip.

21. The system of claim 9, wherein the first transceiver and the first WDM MUX/De-MUX are integrated into the optical chip.

22. The system of claim 9, wherein a first receiver of the first transceiver and a second receiver of the second transceiver are integrated into an array on an optical chip.

23. The system of claim 9, further comprising a saturating laser coupled to adjust a gain of the gain element.

24. The system of claim 9, further comprising a pump coupled to adjust a gain of the gain element.

25. A method, comprising:
transmitting a first set of optical signals along a first wavelength channel in a first direction from a first transceiver;
transmitting a second set of optical signals along the first wavelength channel in a second direction from a second transceiver, wherein the second direction is opposite to the first direction;
locking a first wavelength of the first transceiver using the second set of the optical signals; and
locking a second wavelength of the second transceiver using the first set of the optical signals, wherein the first transceiver saturates gain within a first response time to output the first set of optical signals, wherein the first response time is of the same order of magnitude or shorter than a first time period of data modulation onto the second set of optical signals to remove effects of the data modulation in the second direction that cause noise in the first direction, and the second transceiver saturates gain within a second response time to output the second set of optical signals, wherein the second response time is of the same order of magnitude or shorter than a second time period of the data modulation onto the first set of optical signals to remove effects of the data modulation in the first direction that cause noise in the second direction, wherein the first transceiver and the second transceiver saturate each other due to mutual wavelength locking.

26. The method of claim 25, further comprising amplifying the set of the optical signals.

27. The method of claim 25, further comprising scrambling the set of the optical signals.

28. The method of claim 25, further comprising operating the transceiver in a saturated gain condition.

29. The method of claim 25, further comprising controlling a mode of the transceiver.

30. The method of claim 25, further comprising
transmitting a third set of the optical signals along a second wavelength channel from a third transceiver;
multiplexing the first set and the third set to transmit along a transmission medium;
de-multiplexing the first set and the third set to send to the second transceiver and the fourth transceiver;
transmitting a fourth set of the optical signals along the second wavelength channel from a fourth transceiver;
multiplexing the second set and the fourth set to transmit along the transmission medium; and
de-multiplexing the second set and the forth set to send to the first transceiver and the third transceiver.

31. The method of claim 28, further comprising
routing the first set of the optical signals to the second transceiver using a Time Division Multiplexing ("TDM") scheme.

32. An apparatus, comprising:
means for transmitting a first set of optical signals along a first wavelength channel in a first direction from a first transceiver;
means for transmitting a second set of optical signals along the first wavelength channel in a second direction from a second transceiver, wherein the second direction is opposite to the first direction;
means for locking a first wavelength of the first transceiver using the second set of the optical signals; and
means for locking a second wavelength of the second transceiver using the first set of the optical signals, wherein the first transceiver saturates gain within a first response time to output the first set of optical signals, wherein the first response time is of the same order of magnitude or shorter than a first time period of data modulation onto the second set of optical signals to remove effects of the data modulation in the second direction that cause noise in the first direction, and the second transceiver saturates gain within a second response time to output the second set of optical signals, wherein the second response time is of the same order of magnitude or shorter than a second time period of the data modulation onto the first set of optical signals to remove effects of the data modulation in the first direction that cause noise in the second direction, wherein the first transceiver and the second transceiver are mutually saturated due to wavelength locking.

33. The apparatus of claim 32, further comprising means for amplifying the set of the optical signals.

34. The apparatus of claim 32, further comprising means for scrambling the set of the optical signals.

35. The apparatus of claim 32, further comprising means for operating the transceiver in a saturated gain condition.

36. The apparatus of claim 32, further comprising
means for transmitting a third set of optical signals along a second wavelength channel from a third transceiver;
means for multiplexing the first set and the third set to transmit along a transmission medium;
means for de-multiplexing the first set and the third set to send to the second transceiver and the fourth transceiver;
means for transmitting a fourth set of the optical signals along the second wavelength channel from a fourth transceiver;
means for multiplexing the second set and the fourth set to transmit along the transmission medium; and
means for de-multiplexing the second set and the forth set to send to the first transceiver and the third transceiver.

37. The apparatus of claim 33, further comprising
means for splitting the first set of the optical signals to the second transceiver using a Time Division Multiplexing ("TDM") scheme.

* * * * *